(12) United States Patent
Nishikawa et al.

(10) Patent No.: US 9,067,574 B2
(45) Date of Patent: Jun. 30, 2015

(54) HYDRAULIC MODULATOR

(75) Inventors: Yutaka Nishikawa, Saitama (JP);
Kazuhiko Tani, Saitama (JP); Makoto Toda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 826 days.

(21) Appl. No.: 13/311,004

(22) Filed: Dec. 5, 2011

(65) Prior Publication Data

US 2012/0148428 A1  Jun. 14, 2012

(30) Foreign Application Priority Data

Dec. 8, 2010 (JP) ................. 2010-274009

(51) Int. Cl.
| | |
|---|---|
| *F15B 7/00* | (2006.01) |
| *F15B 7/08* | (2006.01) |
| *B60T 8/26* | (2006.01) |
| *B60T 8/36* | (2006.01) |
| *B60T 8/40* | (2006.01) |

(52) U.S. Cl.
CPC .............. *B60T 8/261* (2013.01); *B60T 8/368* (2013.01); *B60T 8/4081* (2013.01)

(58) Field of Classification Search
CPC .............................. B60T 13/745; B60T 11/16
USPC .................................................. 60/545, 594
See application file for complete search history.

(56) References Cited

U.S. PATENT DOCUMENTS

| | | | | |
|---|---|---|---|---|
| 2,631,431 | A | * | 3/1953 | Grebe ............................ 60/477 |
| 2003/0024245 | A1 | * | 2/2003 | Fulks et al. .................... 60/545 |
| 2007/0252430 | A1 | * | 11/2007 | Nishikawa et al. ........ 303/113.4 |

FOREIGN PATENT DOCUMENTS

JP   2005-212679 A   8/2005

OTHER PUBLICATIONS

Machine Translation of Japanese Patent Publication 2005-212679A.*

* cited by examiner

*Primary Examiner* — Edward Look
*Assistant Examiner* — Daniel Collins
(74) *Attorney, Agent, or Firm* — Birch, Stewart, Kolasch & Birch, LLP

(57) ABSTRACT

A hydraulic modulator including a motor having a motor housing, a stator, a rotor, and a motor shaft. A power transmitting mechanism is provided for transmitting the power of the motor to the outside thereof. A master cylinder includes a piston linearly movable by the power transmitted by the power transmitting mechanism. The master cylinder is arranged so as to overlap the motor housing in such a manner that the axis of the master cylinder is substantially perpendicular to the axis of the motor shaft. The master cylinder is arranged on one side of the motor housing in the range corresponding to the axial length of the motor shaft. The length of the hydraulic modulator along the motor shaft falls within the axial length of the motor shaft, so that the hydraulic modulator can be reduced in size.

20 Claims, 7 Drawing Sheets

HYDRAULIC MODULATOR

CROSS-REFERENCE TO RELATED APPLICATIONS

The present application claims priority under 35 USC 119 to Japanese Patent Application No. 2010-274009 filed on Dec. 8, 2010 the entire contents of which are hereby incorporated by reference.

BACKGROUND OF THE INVENTION

1. Field of the Invention

The present invention relates to a hydraulic modulator for supplying a hydraulic pressure to a brake device for a wheel.

2. Description of Background Art

A brake device is known which can reduce a pressure in a brake pipe upon operation of ABS (Antilock Brake System), so as to avoid the idle operation of a wheel.

In addition, a brake device is known such that when a brake operating member (lever or pedal) is operated, an input oil pressure according to the operation of the brake operating member is detected and a hydraulic pressure corresponding to this input oil pressure can be generated. See, for example, FIG. 4 of Japanese Patent Laid-open No. 2005-212679.

In Japanese Patent Laid-open No. 2005-212679, FIG. 4 illustrates a hydraulic modulator (6) adapted to be mounted on a motorcycle (the numeral in parentheses is the same as that shown in Japanese Patent Laid-open No. 2005-212679, and the same applies to the other numerals).

In the hydraulic modulator (6), a camshaft (24) is rotatable by a motor (23). A cam roller (25) is provided at a position offset from the center of the camshaft (24), and a piston (16) is in abutment against the cam roller (25). The piston (16) is advanced into or retracted from a hydraulic chamber (17).

When the camshaft (24) is rotated by operating the motor (23) to move the cam roller (25) toward the hydraulic chamber (17), the hydraulic pressure in the hydraulic chamber (17) is increased. Conversely, when the cam roller (25) is moved away from the hydraulic chamber (17), the hydraulic pressure in the hydraulic chamber (17) is reduced.

As shown in FIG. 4 of Japanese Patent Laid-open No. 2005-212679, a master cylinder composed of a cylinder (15), the piston (16), and the hydraulic chamber (17) is integral with the motor (23), so that the hydraulic modulator (6) can be made compact and it is suitable for use in a motorcycle.

However, a space in a motorcycle is extremely limited as compared with that in a four-wheeled vehicle. It is therefore desired to make the hydraulic modulator (6) more compact.

SUMMARY AND OBJECTS OF THE INVENTION

It is accordingly an object of an embodiment of the present invention to provide a hydraulic modulator which can be further reduced in size.

In accordance with an embodiment of the present invention, there is provided a hydraulic modulator including a motor having a motor housing, a stator provided in the motor housing, a rotor provided in the motor housing, and a motor shaft extending from the rotor and having one end projecting from the motor housing. A power transmitting mechanism is provided for transmitting the power of the motor with a master cylinder having a piston linearly movable by the power transmitted by the power transmitting mechanism. The master cylinder is arranged so as to overlap the motor housing in such a manner that the axis of the master cylinder is substantially perpendicular to the axis of the motor shaft.

According to an embodiment of the present invention, the power transmitting mechanism includes a camshaft for driving the piston and a plurality of gears for transmitting the power of the motor to the camshaft to rotate the camshaft; wherein one end portion of the camshaft is located in the vicinity of a plane intersecting one end of the motor shaft at right angles to the motor shaft, and the camshaft extends from the one end portion to the same side as that of extension of the motor shaft in parallel to the motor shaft.

According to an embodiment of the present invention, the camshaft is shorter than the motor shaft, and a potentiometer for detecting a rotational angle of the camshaft is connected to the other end portion of the camshaft.

According to an embodiment of the present invention, a connection terminal for the potentiometer is directed so as to be superimposed on the master cylinder.

According to an embodiment of the present invention, the master cylinder includes a plurality of master cylinders arranged in the axial direction of the motor shaft.

According to an embodiment of the present invention, the master cylinder is arranged so as to overlap the motor housing. With this arrangement, the master cylinder can be located in a dead space in the hydraulic modulator, so that the hydraulic modulator can be made compact.

According to an embodiment of the present invention, the power transmitting mechanism includes the camshaft for driving the piston and the plurality of gears for transmitting the power of the motor to the camshaft to rotate the camshaft, wherein one end portion of the camshaft is located in the vicinity of the plane intersecting one end of the motor shaft at right angles to the motor shaft, and the camshaft extends from the one end portion to the same side as that of extension of the motor shaft in parallel to the motor shaft.

The plurality of gears can be arranged along the plane intersecting one end of the motor shaft at right angles to the motor shaft. Accordingly, there is no possibility of undue extension of the power transmitting mechanism, so that the hydraulic modulator can be further reduced in size.

According to an embodiment of the present invention, the camshaft is shorter than the motor shaft, and the potentiometer for detecting a rotational angle of the camshaft is connected to the other end portion of the camshaft. Accordingly, a space can be formed near the other end portion of the camshaft, and the potentiometer can be located in this space. As a result, a dead space can be eliminated and the hydraulic modulator can also be further reduced in size.

According to an embodiment of the present invention, the connection terminal for the potentiometer is directed so as to be superimposed on the master cylinder. In other words, the connection terminal extends in the same direction as that of extension of the master cylinder. A harness connected to the connection terminal can extend parallel to the master cylinder. Since the master cylinder is elongated in the axial direction thereof, the harness can linearly extend from the connection terminal. It is not necessary to bend the harness in the vicinity of the connection terminal, so that the durability of the harness can be exhibited. In addition, the harness can be well stored and easily routed.

According to an embodiment of the present invention, the plurality of master cylinders are provided and arranged in the axial direction of the motor shaft. The pressure receiving area of each master cylinder coincides with that of each piston. By providing the plurality of master cylinders, the total pressure receiving area of the plurality of master cylinders can be increased to a value a plurality of times the pressure receiving area of each master cylinder, thereby easily ensuring a necessary pressure receiving area. Further, a necessary pressure receiving area is equal to the sum of the pressure receiving areas of the plurality of pistons. Accordingly, by increasing the number of pistons, the diameter of each piston can be reduced in ensuring a necessary pressure receiving area. By reducing the diameter of each piston, the thickness of each master cylinder can be reduced.

According to an embodiment of the present invention, a necessary pressure receiving area can be ensured and each master cylinder can be reduced in size at the same time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
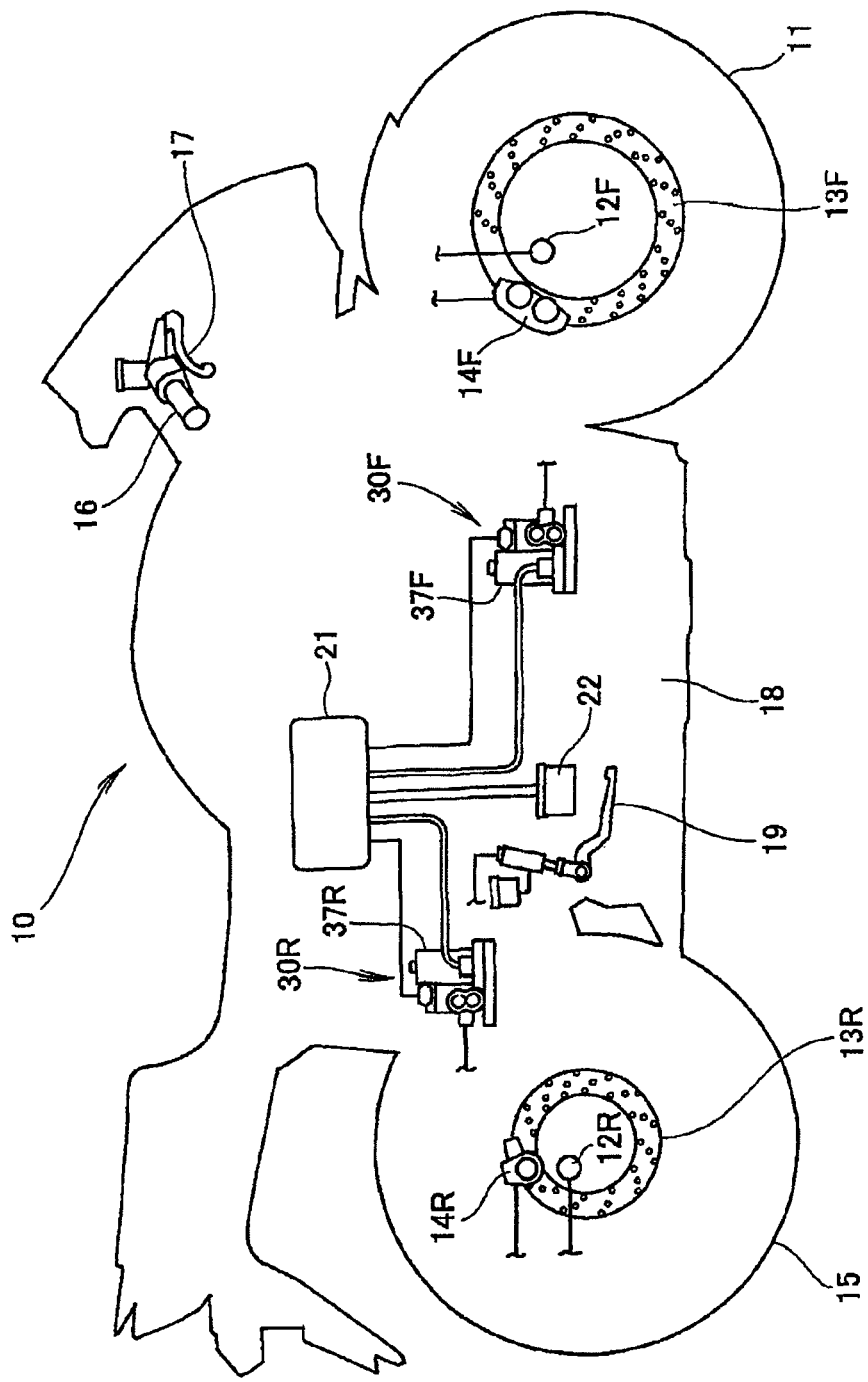
FIG. 1 is a schematic side view for illustrating the location of a brake device in a motorcycle.

A mode for carrying out the present invention will now be described with reference to the attached drawings. The orientation of each drawing is the same as that of the reference numerals included therein.

FIG. 1 illustrates a motorcycle 10. The motorcycle 10 includes a front wheel 11, a rear wheel 15, a steering handle 16, and a vehicle body 18. A front wheel speed sensor 12F (F means the front side of the vehicle, and the same applies to the following), a brake disc 13F, and a brake caliper 14F are provided in the vicinity of the front wheel 11. A rear wheel speed sensor 12R (R means the rear side of the vehicle, and the same applies to the following), a brake disc 13R, and a brake caliper 14R are provided in the vicinity of the rear wheel 15. A brake lever 17 to be operated by an operator's hand is provided on the steering handle 16. A brake pedal 19 to be operated by an operator's foot is provided at a lower central portion of the vehicle body 18. Hydraulic modulators 30F and 30R for adjusting a hydraulic pressure to be sent to the brake calipers 14F and 14R are provided on the vehicle body 18. A controller 21 and a battery 22 are provided on the vehicle body 18.

The mutual relation and operation of these components will now be described with reference to FIG. 2.

For the ease of illustration, a front wheel braking system in a noncombination mode will now be described.

Front wheel braking is performed so as to select any one of a first mode where the rotational speed of the front wheel is zero or not greater than a predetermined value, a second mode where the rotational speed of the front wheel is greater than the predetermined value, and a third mode where the rotational speed of the front wheel is greater than the predetermined value and the operational amount of a front operating member is greater than a predetermined value.

The first to third modes mentioned above will now be described in sequence with reference to FIG. 2.

First Mode:

Speed information obtained by the front wheel speed sensor 12F is sent to the controller 21. When the front wheel speed is determined to be less than or equal to the predetermined value, the controller 21 keeps closing a first solenoid valve 31F (normally closed), opening a second solenoid valve 32F (normally open), and closing a third solenoid valve 33F (normally closed). When the brake lever 17 is operated, a hydraulic pressure is generated in a master cylinder 34F and it is transmitted to the brake caliper 14F. Accordingly, in a rest condition of the vehicle or during running at very low speeds, each solenoid is not energized and energy saving can therefore be expected.

The brake caliper 14F operates to brake the brake disc 13F. The first mode is applied also in the case when a main switch is OFF.

When the normally closed solenoid becomes abnormal, it is maintained in a normally closed condition by the push force of a spring, whereas when the normally open solenoid becomes abnormal, it is maintained in a normally open condition by the push force of a spring.

Second Mode:

Speed information obtained by the front wheel speed sensor 12F is sent to the controller 21. When the front wheel speed is determined to be greater than the predetermined value, the controller 21 opens the first solenoid valve 31F. The second solenoid valve 32F and the third solenoid valve 33F are maintained in the closed condition. The second mode is a standby mode prior to so-called BBW (the third mode).

Third Mode:

Speed information obtained by the front wheel speed sensor 12F is sent to the controller 21. Further, operational amount information obtained by an operational amount detector 36F is sent to the controller 21. When the front wheel speed is determined to be greater than the predetermined value and the operational amount is determined to be greater than the predetermined value, the controller 21 keeps opening the first solenoid valve 31F, closes the second solenoid valve 32F, and opens the third solenoid valve 33F.

Since the second solenoid valve 32F is closed, the hydraulic pressure generated in the master cylinder 34F is not transmitted to the brake caliper 14F. Instead of the operation of the master cylinder 34F, the controller 21 operates the hydraulic modulator 30F. More specifically, the controller 21 starts a motor 37F to rotate a camshaft 39F through a reduction gear mechanism 38F, thereby advancing pistons 41F of master cylinders 40F. A hydraulic pressure generated in the master cylinders 40F is transmitted through the third solenoid valve 33F to the brake caliper 14F. The brake caliper 14F operates to brake the brake disc 13F.

The hydraulic pressure generated in the master cylinder 34F is also applied to a stroke simulator 35F because the first solenoid valve 31F is open. The stroke simulator 35F operates in such a manner that a piston 42F is moved against a spring 43F according to the hydraulic pressure applied, so that the volume in an oil passage is increased. As a result, "play" is given to the brake lever 17. That is, an operational feel of the brake lever 17 is maintained.

The operational amount of the brake lever 17 is converted into an electrical signal, which is in turn sent through a wire to the controller 21. Then, the controller 21 controls the hydraulic modulator 30F through a wire. Thus, the hydraulic modulator 30F is controlled through the wires, so that this control system is referred to as a by-wire type brake system (brake-by-wire; BBW).

The first to third modes mentioned above are similarly applied to the rear wheel 15 and the brake pedal 19. The related components are affixed by the symbol R. The configuration and operation of these related components are the same as those of the components for the front wheel 11, so the description thereof will be omitted herein.

In the braking system, combination braking and ABS operation are also performed.

The combination braking is performed in such a manner that when the brake lever 17 is operated, the front wheel 11 and the rear wheel 15 are both braked at a given braking ratio irrespective of the operation of the brake pedal 19. This control is performed by the controller 21.

Further, the difference between a vehicle speed and a rotational speed of the rear wheel is detected. When this difference is increased and the occurrence of slip of the rear wheel is therefore expected, a braking force applied to the rear wheel is reduced to prevent the occurrence of slip of the rear wheel. This control is similarly applied to the front wheel.

This control system is referred to as ABS operation. More specifically, the controller 21 operates to return a camshaft 39R and to thereby retract pistons 41R, thus performing the ABS operation.

The structure of a hydraulic modulator as a main component in the by-wire type brake system will now be described in detail.

As shown in FIG. 1, the motor 37F of the hydraulic modulator 30F is located on the rear side in the longitudinal direction of the vehicle, whereas the motor 37R of the hydraulic modulator 30R is located on the front side in the longitudinal direction of the vehicle. That is, the hydraulic modulator 30F and the hydraulic modulator 30R are arranged in mirror-image relationship (symmetric with respect to a line), but the components of the hydraulic modulator 30F are the same as those of the hydraulic modulator 30R.

Accordingly, only the hydraulic modulator 30R will now be typically described.

Figure 3:
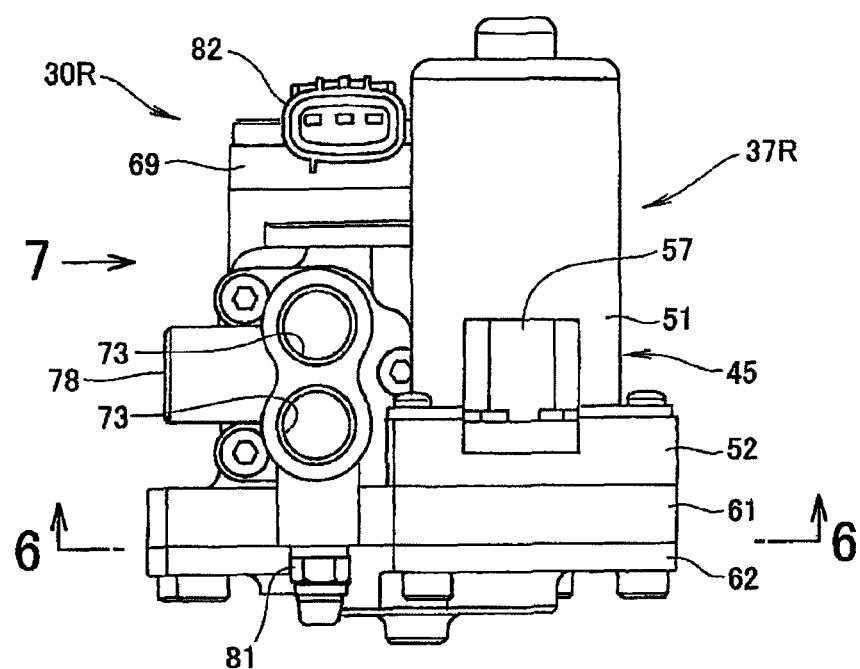
FIG. 3 is an elevational view of a hydraulic modulator according to the present invention.
Figure 4:
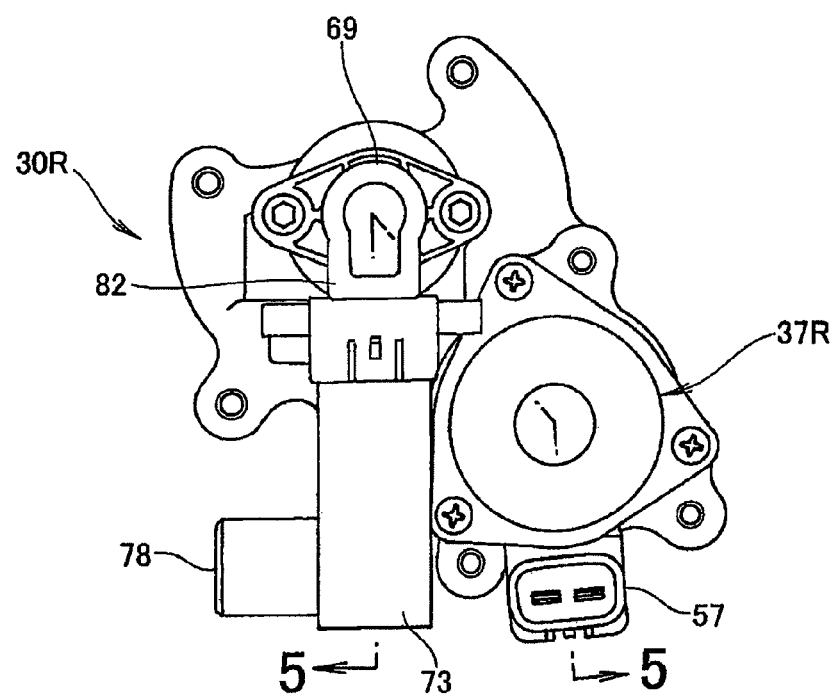
FIG. 4 is a plan view of the hydraulic modulator shown in FIG. 3.
Figure 5:
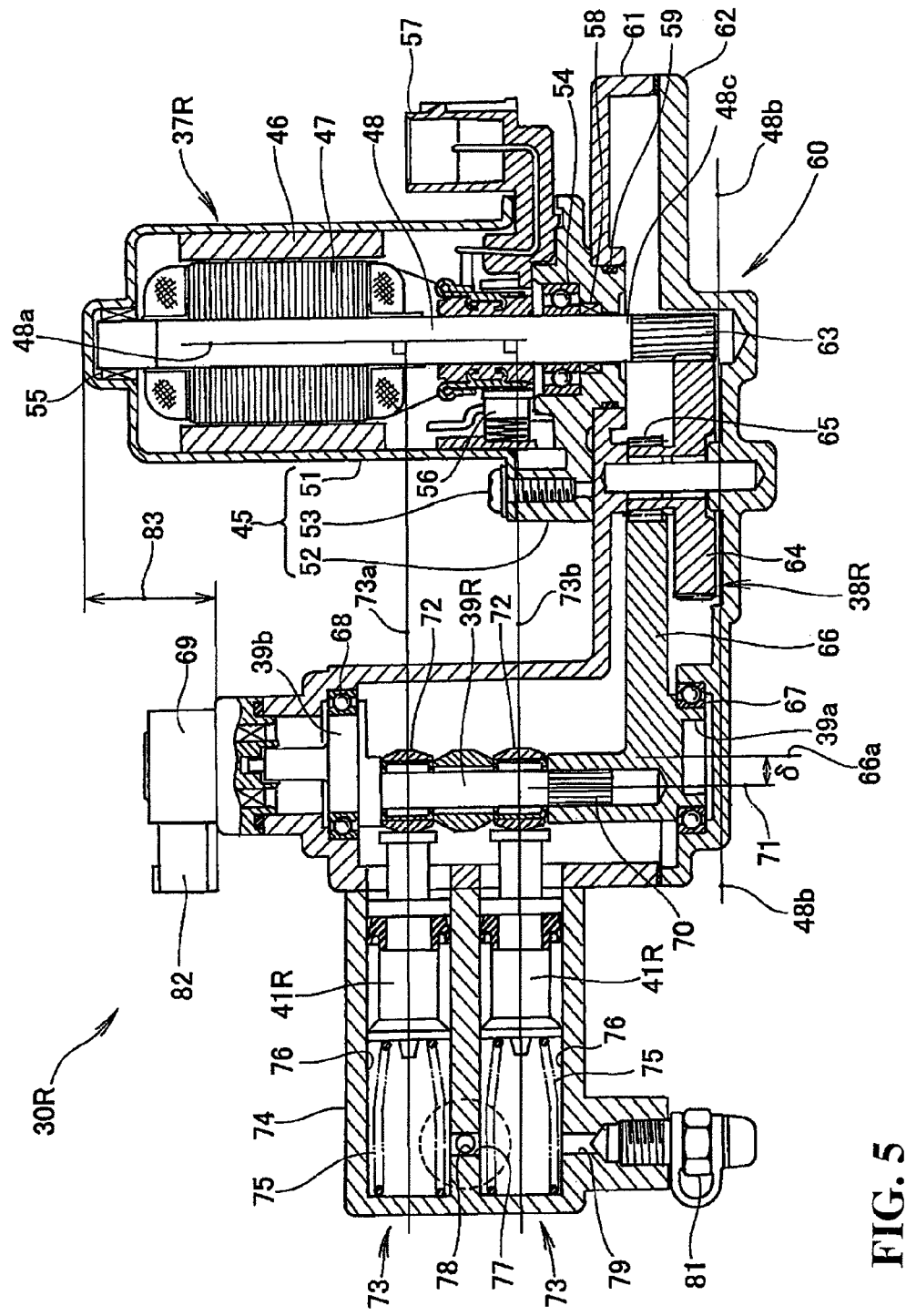
FIG. 5 is a cross section taken along the line 5-5 in FIG. 4.

FIG. 3 is an elevational view of the hydraulic modulator 30R, FIG. 4 is a plan view of the hydraulic modulator 30R, and FIG. 5 is a sectional view of the hydraulic modulator 30R (cross section taken along the line 5-5 in FIG. 4).

As shown in FIG. 5, the motor 37R is composed of a motor housing 45, a stator 46 provided in the motor housing 45, a rotor 47 provided in the motor housing 45, and a motor shaft 48 extending downward from the rotor 47 and having one end (lower end) projecting from the motor housing 45.

The motor housing 45 is composed of a cylindrical motor case 51 having an open end (lower opening), a motor lid 52 for closing the lower opening of the motor case 51, and a plurality of bolts 53 for fastening the motor lid 52 to the motor case 51.

The motor shaft 48 is supported by two bearings 54 and 55. The bearing 54 is mounted on the motor lid 52, and the bearing 55 is mounted on the motor case 51.

A motor terminal 57 for supplying a current to a brush 56 is provided on the motor lid 52.

A power transmitting mechanism 60 is provided for transmitting the power of the motor 37R to the outside thereof. The power transmitting mechanism 60 is composed of a speed reducer case 61, a speed reducer lid 62, and a plurality of gears (reduction gear mechanism 38R).

The motor 37R is mounted on the speed reducer case 61 in such a manner that the motor lid 52 abuts against the speed reducer case 61.

The speed reducer lid 62 is joined to the speed reducer case 61 to thereby define a space for storing the reduction gear mechanism 38R.

The gap between the motor shaft 48 and the motor lid 52 is sealed by a sealing member 58, and the gap between the motor lid 52 and the speed reducer case 61 is sealed by an O ring 59. Accordingly, there is no possibility that the storing space for the reduction gear mechanism 38R may communicate with the inside space of the motor case 51.

The reduction gear mechanism 38R is composed of a first gear 63 formed at one end of the motor shaft 48, a second gear 64 having a diameter larger than that of the first gear 63 and meshing with the first gear 63, a third gear 65 having a diameter smaller than that of the second gear 64 and being integral with the second gear 64, and a sector gear 66 meshing with the third gear 65.

The sector gear 66 is rotatably supported through a bearing 67 to the speed reducer lid 62. The camshaft 39R has an L-shaped configuration and one end of the camshaft 39R is engaged with the sector gear 66. That is, the camshaft 39R is connected through a spline 70 to the sector gear 66, so that the camshaft 39R is removable from the sector gear 66 and the torque (rotational force) of the sector gear 66 can be transmitted to the camshaft 39R. The camshaft 39R and the sector gear 66 may be integral with each other. For convenience, a portion of the sector gear 66 fitted to the bearing 67 is referred to as one end portion 39a of the camshaft 39R.

The other end portion 39b of the camshaft 39R is supported through a bearing 68 to the speed reducer case 61. A potentiometer 69 for detecting a rotational angle of the camshaft 39R is connected to the other end portion 39b of the camshaft 39R.

The camshaft 39R has an axis 71 offset by $\delta$ from the center 66a of rotation of the sector gear 66. Two rollers 72 are rotatably mounted on the camshaft 39R.

Figure 2:
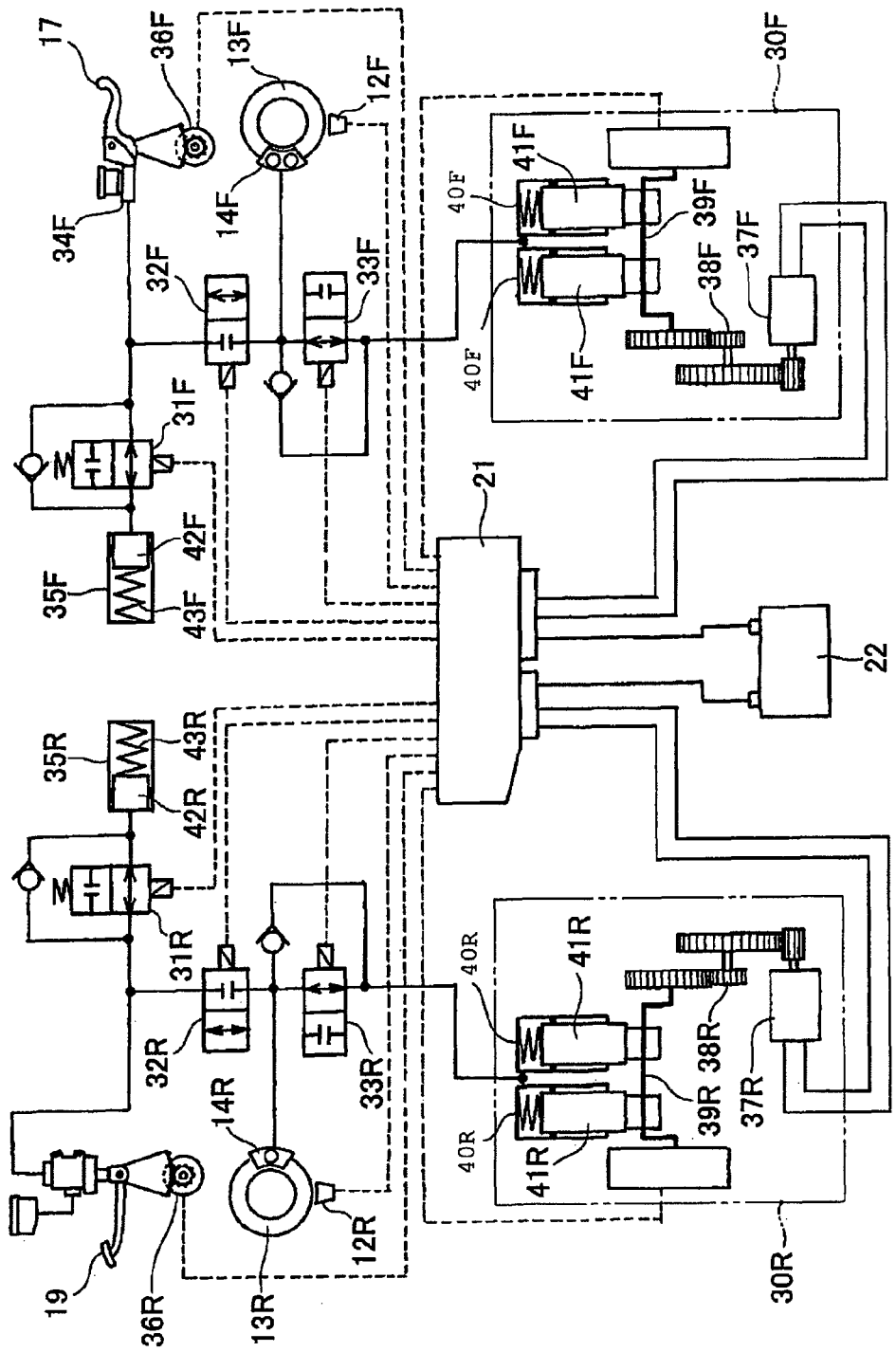
FIG. 2 is a diagram for illustrating a system for the brake device in the motorcycle shown in FIG. 1.

The hydraulic modulator 30R includes two master cylinders 73 (40R in FIG. 2). The master cylinder 73 arranged on the side of the other end portion 39b of the camshaft 39R has an axis 73a, whereas the master cylinder 73 arranged on the side of one end portion 39a of the camshaft 39R has an axis 73b.

More specifically, a cylinder case 74 extends from the speed reducer case 61 in such a manner that the axes 73a and 73b of the two master cylinders 73 are substantially perpendicular to the axis 48a of the motor shaft 48. Two pistons 41R are stored in the cylinder case 74. These two pistons 41R are normally biased by two springs 75 toward the camshaft 39R in such a manner that the front ends (right ends in FIG. 5) of the two pistons 41R abuts against the two rollers 72, respectively. Two oil chambers 76 are defined in the cylinder case 74, and the two springs 75 are stored in these two oil chambers 76, respectively. These two oil chambers 76 communicate with each other through a communication passage 77. A pressure oil outlet 78 is connected to the communication passage 77. A drain port 79 is formed in the cylinder case 74 at a lowest position of the lower oil chamber 76. The drain port 79 is normally closed by a drain plug 81. By loosening the drain plug 81, the oil in the oil chambers 76 can be suitably drained.

As viewed in FIG. 5, the axis 73b of the lower master cylinder 73 intersects the motor shaft 48 at a position on the rotor 47 side with respect to a projecting portion 48c of the motor shaft 48. More specifically, the axis 73b of the lower master cylinder 73 intersects the motor shaft 48 at a position on the rotor 47 side with respect to the lower bearing 54 for supporting the projecting portion 48c of the motor shaft 48.

Figure 6:
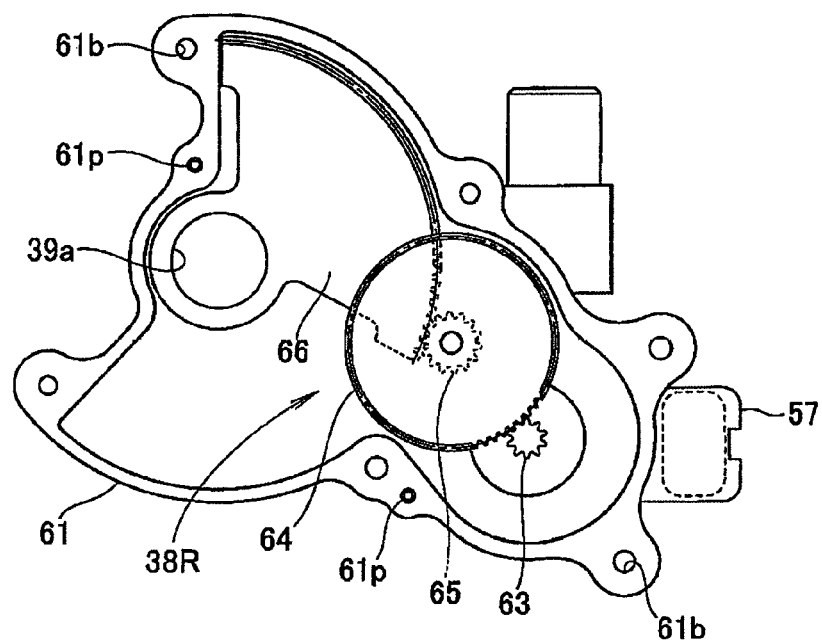
FIG. 6 is a view taken in the direction of the arrows 6 in FIG. 3.

As shown in FIG. 6, the power of the motor 37R is sequentially transmitted from the first gear 63 through the second gear 64 and the third gear 65 to the sector gear 66, thereby reducing the rotational speed of the motor shaft 48 and increasing the torque of the motor shaft 48 to rotate one end portion 39a of the camshaft 39R. A plurality of (two in this preferred embodiment) positioning pins 61p project from the speed reducer case 61 to position the speed reducer lid 62 (see FIG. 5). Further, the speed reducer case 61 is formed with a plurality of bolt holes 61b for insertion of connecting bolts, thereby fixing the speed reducer lid 62 to the speed reducer case 61. This configuration is preferable in reducing the number of man-hours for assembly.

As shown in FIG. 5, the camshaft 39R is similar to a crankshaft and therefore functions to advance or retract the pistons 41R.

As shown in FIG. 3, the motor housing 45 is mounted on the speed reducer case 61 so as to extend vertically in such a manner that the motor lid 52 is mounted on the speed reducer case 61 and the motor case 51 is mounted on the motor lid 52. The two master cylinders 73 are located on one side of the motor 37R in such a manner that the axes of the master cylinders 73 extends in the direction perpendicular to the plane of the sheet of FIG. 3. The potentiometer 69 is located above the master cylinders 73.

As shown in FIG. 4, a connection terminal 82 for the potentiometer 69 is directed so as to be superimposed on the master cylinders 73. Accordingly, when an external harness is connected to the connection terminal 82, the external harness extends so as to be superimposed on the master cylinders 73 and to pass on one side of the motor 37R. Thus, the space for connection of the external harness can be well ensured.

Further, the master cylinders 73 are located close to the motor 37R. That is, the motor 37R and the master cylinders 73 are densely arranged, thereby reducing the plane area of the hydraulic modulator 30R. As a result, the hydraulic modulator 30R can be made sufficiently compact.

Figure 7:
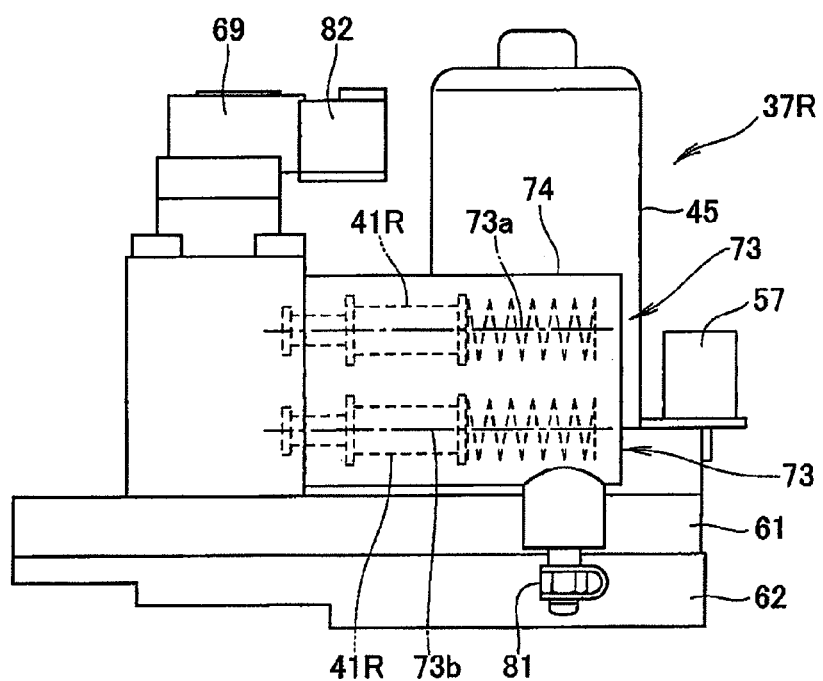
FIG. 7 is a view taken in the direction of the arrow 7 in FIG. 3.

As shown in FIG. 7 which is a side view taken in the direction of the arrow 7 in FIG. 3, the master cylinders 73 overlap the motor housing 45 in the direction perpendicular to the plane of the sheet of FIG. 7.

The preferred embodiment of the present invention having the above configuration may be summarized as follows:

As shown in FIG. 5, the hydraulic modulator 30R includes the motor 37R including the motor housing 45, the stator 46 provided in the motor housing 45, the rotor 47 provided in the motor housing 45, and the motor shaft 48 extending from the rotor 47 and having one end projecting from the motor housing 45; the power transmitting mechanism 60 for transmitting the power of the motor 37R; and the master cylinders 73 having the pistons 41R linearly movable by the power transmitted by the power transmitting mechanism 60, wherein the master cylinders 73 are arranged so as to overlap the motor housing 45 as shown in FIG. 7 in such a manner that the axes 73a and 73b of the master cylinders 73 are substantially perpendicular to the axis 48a of the motor shaft 48.

As described above, the master cylinders 73 are arranged so as to overlap the motor housing 45 as viewed in side elevation. With this arrangement, the master cylinders 73 can be located in a dead space in the hydraulic modulator 30R, so that the hydraulic modulator 30R can be made compact.

The power transmitting mechanism 60 includes the camshaft 39R for driving the pistons 41R and the plurality of gears 63 to 66 for transmitting the power of the motor 37R to the camshaft 39R to rotate the camshaft 39R, wherein one end portion 39a of the camshaft 39R is located in the vicinity of a plane 48b intersecting one end of the motor shaft 48 at right angles to the motor shaft 48, and the camshaft 39R extends from the one end portion 39a to the same side (the upper side as viewed in FIG. 5) as that of extension of the motor shaft 48 in parallel to the motor shaft 48.

The plurality of gears 63 to 66 can be arranged along the plane 48a intersecting one end of the motor shaft 48 at right angles to the motor shaft 48. Accordingly, there is no possibility of an undue extension of the power transmitting mechanism 60, so that the hydraulic modulator 30R can be further reduced in size.

As shown in FIG. 5, the camshaft 39R is shorter than the motor shaft 48, and the potentiometer 69 for detecting a rotational angle of the camshaft 39R is connected to the other end portion 39b of the camshaft 39R. Accordingly, a space 83 can be formed near the other end portion 39b of the camshaft 39R, and the potentiometer 69 can be located in this space 83. As a result, a dead space can be eliminated and the hydraulic modulator 30R can also be further reduced in size.

The plurality of master cylinders 73 (two master cylinders in this preferred embodiment) are provided and arranged in the axial direction of the motor shaft 48. The pressure receiving area of each master cylinder 73 coincides with that of each piston 41R. By providing the plurality of master cylinders 73, the total pressure receiving area of the plurality of master cylinders 73 can be increased to a value plurality of times the pressure receiving area of each master cylinder 73, thereby easily ensuring a necessary pressure receiving area. Further, a necessary pressure receiving area is equal to the sum of the pressure receiving areas of the plurality of pistons 41R. Accordingly, by increasing the number of pistons 41R, the diameter of each piston 41R can be reduced in ensuring a necessary pressure receiving area. By reducing the diameter of each piston 41R, the thickness of each master cylinder 73 (the size in the direction perpendicular to the plane of the sheet of FIG. 5) can be reduced. Thus, a necessary pressure receiving area can be ensured and each master cylinder 73 can be reduced in size at the same time.

While the two master cylinders 73 are provided in this preferred embodiment, a single master cylinder or three or more master cylinders may be provided in the present invention.

Further, while the hydraulic modulator of the present invention is suitable for use in a motorcycle limited in installation space for on-vehicle equipment, the present invention is also applicable to a three-wheeled vehicle and a four-wheeled vehicle.

The hydraulic modulator of the present invention is suitable for use in a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic modulator comprising:
   a motor including a motor housing,
   a stator provided in the motor housing,
   a rotor provided in the motor housing, and
   a motor shaft extending from the rotor and having one end projecting from the motor housing;

a power transmitting mechanism for transmitting power of the motor;

a master cylinder having a piston linearly movable by the power transmitted by the power transmitting mechanism, and a lower bearing for supporting a projecting portion of the motor shaft, wherein an axis of the master cylinder is substantially perpendicular to an axis of the motor shaft, and the axis of the master cylinder is arranged to extend past a portion of a lateral side of the motor housing containing a section of the motor shaft that is between the lower bearing and the motor.

2. The hydraulic modulator according to claim 1, wherein the power transmitting mechanism includes:

a camshaft for driving said piston and a plurality of gears for transmitting the power of said motor to said camshaft to rotate said camshaft; and one end portion of said camshaft is located in the vicinity of a plane intersecting one end of said motor shaft at right angles to said motor shaft, and said camshaft extends from said one end portion to a same side as that of an extension of said motor shaft in parallel to said motor shaft.

3. The hydraulic modulator according to claim 2, wherein said camshaft is shorter than said motor shaft, and a potentiometer for detecting a rotational angle of said camshaft is connected to the other end portion of said camshaft.

4. The hydraulic modulator according to claim 3, wherein a connection terminal for said potentiometer is directed so as to be superimposed on said master cylinder.

5. The hydraulic modulator according to claim 1, wherein said master cylinder includes a plurality of master cylinders.

6. The hydraulic modulator according to claim 2, wherein said master cylinder includes a plurality of master cylinders.

7. The hydraulic modulator according to claim 1, wherein said master cylinder includes a plurality of master cylinders arranged parallel to each other.

8. The hydraulic modulator according to claim 2, wherein a first gear is formed at one end of the motor shaft for meshing with a second gear, a third gear is attached to the second gear, said third gear meshing with a sector gear being operatively connected to the camshaft to rotate the camshaft.

9. The hydraulic modulator according to claim 8, wherein the second gear has a diameter larger relative to the first gear, and said third gear has a diameter smaller relative to the second gear and being integrally formed with the second gear and said camshaft-being spline connected to said sector gear for removal relative thereto.

10. A hydraulic modulator comprising:

a motor including a motor housing with a motor shaft projecting from one end of the motor housing;

a power transmitting mechanism operatively connected the motor shaft for transmitting power of said motor to the power transmitting mechanism;

a lower bearing for supporting the motor shaft;

and a master cylinder having at least one piston linearly movable by the power transmitting mechanism, wherein the master cylinder is arranged such that an axis of the master cylinder extends past a portion of a lateral side of a portion of the motor housing containing a section of the motor shaft that is between the lower bearing and the motor and the axis of the master cylinder being that is substantially perpendicular relative to an axis of said the motor shaft.

11. The hydraulic modulator according to claim 10, wherein the power transmitting mechanism includes:

a camshaft for driving said piston and a plurality of gears for transmitting the power of said motor to said camshaft to rotate said camshaft; and one end portion of said camshaft is located in the vicinity of a plane intersecting one end of said motor shaft at right angles to said motor shaft, and said camshaft extends from said one end portion to a same side as that of an extension of said motor shaft in parallel to said motor shaft.

12. The hydraulic modulator according to claim 11, wherein said camshaft is shorter than said motor shaft, and a potentiometer for detecting a rotational angle of said camshaft is connected to the other end portion of said camshaft.

13. The hydraulic modulator according to claim 12, wherein a connection terminal for said potentiometer is directed so as to be superimposed on said master cylinder.

14. The hydraulic modulator according to claim 10, wherein said at least one master cylinder includes a plurality of master cylinders.

15. The hydraulic modulator according to claim 11, wherein said at least one master cylinder includes a plurality of master cylinders.

16. The hydraulic modulator according to claim 10, wherein said at least one master cylinder includes a plurality of master cylinders arranged parallel to each other.

17. The hydraulic modulator according to claim 11, wherein a first gear is formed at one end of the motor shaft for meshing with a second gear, a third gear is attached to the second gear, said third gear meshing with a sector gear being operatively connected to the camshaft to rotate the camshaft.

18. The hydraulic modulator according to claim 17, wherein the second gear has a diameter larger relative to the first gear, and said third gear has a diameter smaller relative to the second gear and being integrally formed with the second gear and said camshaft being spline connected to said sector gear for removal relative thereto.

19. A hydraulic modulator comprising:

a motor including a motor housing with a motor shaft projecting from one end of the motor housing;

a power transmitting mechanism operatively connected to the motor shaft for transmitting power of the motor to the power transmitting mechanism;

a lower bearing for supporting the motor shaft;

a master cylinder having at least one piston linearly movable by the power transmitting mechanism;

and a camshaft for driving the at least one piston, wherein the master cylinder is arranged to include an axis being substantially perpendicular relative to an axis of the motor shaft and extends past a portion of a lateral side of a portion of the motor housing containing a section of the motor shaft that is between the lower bearing and the motor, and the motor shaft and the camshaft are parallel to each other, and the motor shaft is arranged so that opposite ends of the motor shaft extend lengthwise beyond opposite ends of the camshaft.

20. The hydraulic modulator according to claim 19, wherein the master cylinder includes a plurality of master cylinders arranged parallel to each other.

* * * * *